United States Patent Office 3,289,368
Patented Dec. 6, 1966

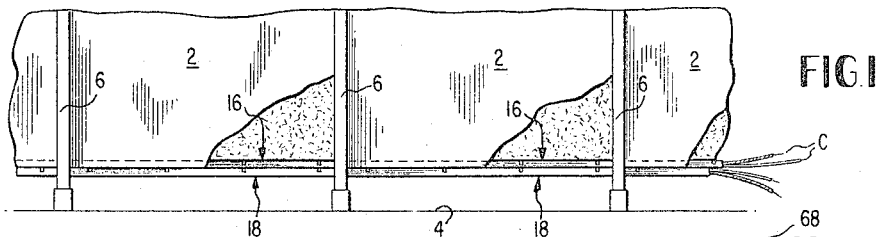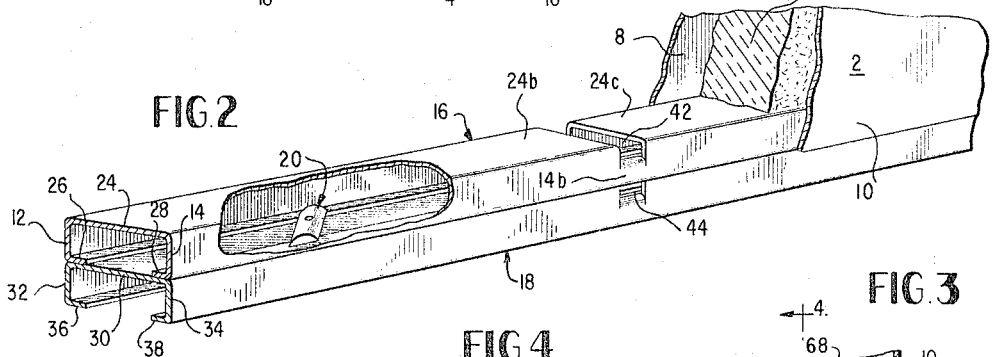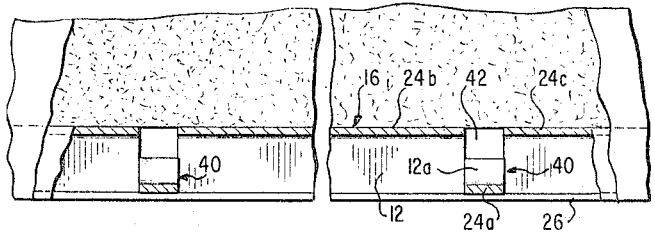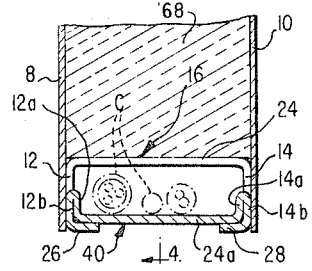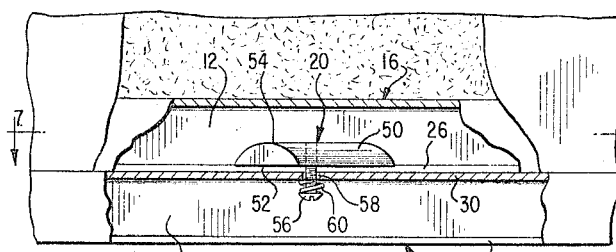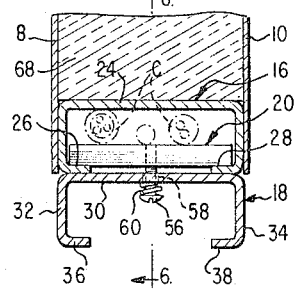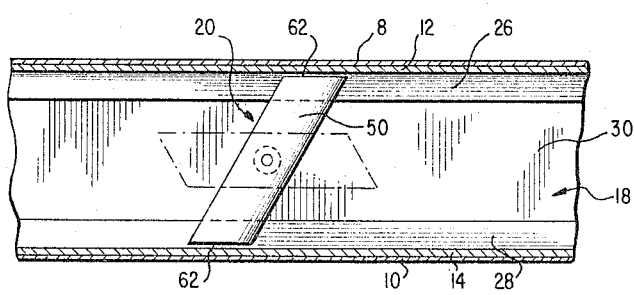
INVENTOR.
EDWARD H. MARK
ATTORNEY

3,289,368
MODULAR PARTITION STRUCTURE
Edward H. Mark, South Bend, Ind., assignor to Interstate Industries Inc., Chicago, Ill., a corporation of Illinois
Filed Feb. 6, 1964, Ser. No. 343,059
11 Claims. (Cl. 52—220)

This invention relates generally to a modular wall construction, and more particularly to a wall panel module including channel members that structurally reinforce the panel and also define passage means for supporting electrical conductors within the unit in a protected, concealed manner.

In offices, stores and the home, there has been a growing trend toward the use of portable modular wall units in constructing room dividers or partitions. These units include posts and panels removably connected with and supported by the posts. Among important considerations in the design and construction of such dividers are manufacturing and installation costs, structural strength and rigidity, and durability. In many applications it is desirable to support the wall panels in elevated relationship to the floor surface to permit ease of cleaning the rooms and also to afford suitable ventilation of the partitioned areas.

In commercial installations, it is necessary to supply electrical and telephone service to the various subdivided areas. Normally the service is afforded by conductors hidden in expensive conduit arrangements in the floors or the walls of the room, or by unsightly, exposed conductors mounted on the floor or baseboard surfaces. The problem of electrical conductor arrangement is particularly troublesome in installations of modular units and in which the panels are elevated above the floor surface as described above.

A primary object of the present invention is to provide an inexpensive wall panel module including longitudinally extending passage means which structurally reinforce the unit and serve for supporting electrical conductors in a hidden protected manner.

Another object of the invention is to provide a modular wall divider construction including vertical wall panels mounted in elevated spaced relationship to the supporting surface, said wall panels containing passage means for receiving, in a concealed manner, a plurality of conductors which afford electrical power and communications service to the partitioned areas.

A further object of the invention is to provide a modular partition unit structure of the foregoing type and having simplicity of design, economy of construction and efficiency in operation.

Briefly, a wall panel construction according to the invention includes a pair of parallel spaced side plates the lower portions of which are secured to the opposite vertical side walls of a longitudinal, unitary channel member, said member including also a horizontal upper wall, and a pair of spaced horizontal flanges that extend inwardly from the lower edges of the side walls. In accordance with the invention, intermediate portions of the upper and side walls of the unitary channel member are punched downwardly to define transverse cable supporting straps that bridge the lower open portions between the spaced horizontal flanges. Consequently, when the panels are arranged end-to-end to establish communication between the channel members, the conductors may be inserted into the channel passage to extend the length of the partition, said conductors being supported by the transverse cable straps.

The invention also encompasses releasable means for connecting an additional separate channel member beneath a panel module of the type described above, thereby increasing the available conductor passage space. Locking means pivotally connected with the upper wall of a lower channel member are adapted for insertion above the horizontal flanges of an upper channel member to connect the additional channel element to the module. In accordance with a specific feature of the invention, the locking means includes a lock member having a vertical dimension that is less than the height of the side walls, the upper surface of said lock member being convex the length thereof to facilitate entry and removal of the cables within the channel passages. According to another feature, the length of the lock member is greater than the distance between the side walls, and the vertical end walls of the lock member are parallel and angularly inclined to abut the inner surfaces of the side walls of the upper channel member, thereby strengthening and stabilizing the connection.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing, wherein like reference characters indicate like parts throughout the several figures and in which:

FIG. 1 is a detailed elevational view of the lower portion of a partition or divider that includes the wall panels of the present invention;

FIG. 2 is a detailed perspective view, with certain parts broken away, of the lower portion of the wall panel;

FIG. 3 is a detailed transverse cross-sectional view of the lower portion of the panel with the lower channel member removed;

FIG. 4 is a sectional view taken along line 4—4 of FIG. 3;

FIG. 5 is a detailed sectional view of the lower portion of the panel with the lower channel member connected with the upper channel member.

FIG. 6 is a sectional view taken along line 6—6 of FIG. 5; and

FIG. 7 is a sectional view taken along line 7—7 of FIG. 6.

Referring first to FIGS. 1 and 2, the wall panel modules 2 of the present invention are of rectangular configuration and are releasably connected with and supported at each end in elevated relationship to the floor surface 4 by vertical supporting posts 6. Each of the panels includes a pair of parallel, spaced metal side plates 8 and 10 the lower portions of which are rigidly secured to the side walls 12 and 14 of a channel member 16. This channel member affords structural stability to the wall panels and also serves as passage means for supporting electrical power and communication conductors C in an elevated concealed manner.

Frequently, there are more conductors than can be accommodated by the channel 16 and in this event a second channel member 18 is releasably connected with the member 16 by locking means 20. The channel member 18 is of exactly the same length as the panels 2 so that in assembly they appear to be an integral part thereof. The vertical posts 6 are provided with knockouts in line with the channel members 16 and 18 of each of the panels to provide communication therebetween and permit the conductors C to extend the length of the partition assembly. The unitary channel members preferably consist of die cast zinc elements, but other metals or materials may be used if desired.

The upper channel member 16 includes a horizontal upper wall 24 connected with the upper edges of side walls 12 and 14. A pair of horizontal flanges 26 and 28 are connected with and extend inwardly from the lower edges of the side walls. Similarly, the lower channel member 18 includes an upper wall 30, a pair of side walls 32 and 34, and a pair of horizontal flanges 36 and 38. Accordingly to the invention intermediate portions of each of the channel members are punched to form a plurality of longitudinally spaced cable or conductor supporting straps 40.

Referring to FIGS. 2–4, an intermediate portion of the top wall 24 of upper channel member 16 and the adjacent upper portions of said walls 12 and 14 are punched downwardly and are so deformed that the punched out top wall portion 24a is horizontal and engages the upper surfaces of flanges 26 and 28, and the partially punched outside wall portions 12a and 14a are vertical and engage the adjacent inner surfaces of side wall reduced portions 12b and 14b. Consequently, the punching operation for forming a cable strap 40 produces a space 42 between longitudinally spaced portions 24b and 24c of upper wall 24. A similar space 44 is established during the formation of a cable strap in the lower channel member 18.

Referring now to FIGS. 5–7, the locking means 20 for releasably connecting the lower channel member 18 with the upper channel member 16 includes a lock member 50 having a planar horizontal lower surface 52 and, in transverse cross-section, a curved convex upper surface 54. The lock member is pivotally connected with the upper wall 30 of lower member 18 by a screw or bolt 56 that extends upwardly through aperture 58 in upper wall 30 and is threaded into a corresponding bore in lock member 50. Spring 60 mounted between the head portion of screw 56 and upper wall 30 biases lock member 50 downwardly toward upper wall 30.

The length of lock member 50 is greater than the distance between side walls 12 and 14, and consequently when in the illustrated locking position, the lock member extends above and is seated upon the upper surfaces of flanges 26 and 28 of upper channel member 16. As shown in FIG. 7 the vertical end walls 62 of the lock member are parallel and are angularly inclined to abut side walls 12 and 14, respectively. This abutting engagement serves to stabilize the locking connections between the channel elements and to frictionally maintain the locking members in place.

To construct a partition requiring appreciable conductor passage space, a lower channel 18 is positioned beneath each of the panels 2, the locking members 50 being in the position illustrated by phantom lines in FIG. 7. By means of a screw driver or other suitable tool, the screw 56 and lock member 50 are raised upwardly against the biasing force of spring 60 and are rotated to the position illsutrated in FIGS. 6–8. Upon removal of the screw driver, the locking member is moved downwardly by the spring means into seating engagement with horizontal flanges 26 and 28. There are at least two longitudinally spaced locking means 20 on each of the lower channel members 18, and when these locking means are in the FIG. 7 position they afford a rigid stabilized connection of the members 18 to panels 2.

As the members 18 are the same length as the panels 2 they may be installed at any time that the need arises for additional conductor space. The appropriate knockouts are removed from the posts and the conductors C are then inserted through the channel passages as desired, access for connections thereto being afforded via the longitudinally spaced openings 42 and 44. During axial insertion of the conductors, the curved upper surfaces 54 of the locking members 50 cause the conductor ends to be guided upwardly, thereby avoiding impedance to or bending of the conductor ends during insertion into the channel passages. In the event that additional cable space is desired, a plurality of lower channel members 18 in superimposed interconnected relationship may be connected with the bottoms of the panels 2.

To meet building code or operational requirements, the space within the panels 2 between the side plates 8 and 10 above the channel member 16 may be filled with a suitable fire insulating or sound absorbing material 68. Examples of suitable materials are asbestos fiber, synthetic foams and resins, and the like.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:
1. A modulator partition unit comprising
 (a) a unitary channel member including
  (1) a pair of parallel spaced generally-rectangular vertical side walls,
  (2) a pair of spaced horizontal flanges extending inwardly from the lower edges of said side walls, respectively,
  (3) at least a pair of longitudinally-spaced horizontal upper walls the longitudinal edges of which are connected with the upper edges of said side walls, respectively, said side walls including, in the space between said upper walls, reduced portions having a smaller vertical dimension than the remaining side wall portions,
  (4) and a transverse cable supporting strap beneath the space between said upper walls, said supporting strap including a horizontal first portion adjacent the upper surfaces of said flanges, and a pair of vertical second portions adjacent the inner surfaces of said side wall reduced portions, respectively, said vertical second portions being connected at their lower and upper edges with the longitudinal edges of said strap first portion and with the upper edges of said side wall reduced portions, respectively.

2. A modular partition unit according to claim 1, comprising
 (b) a pair of parallel spaced vertical side plates the lower adjacent surfaces of which contiguously engage and are secured to the exterior surfaces of said side walls, respectively.

3. A modular partition unit according to claim 1, comprising
 (5) at least one lock member on said upper walls for removably attaching said channel member to a like channel member, said lock member comprising a keeper element mounted on said upper wall and comprising the form of a bar having a width less than the space between said flanges and a length greater than the space between said side walls, a headed shank extending upwardly through said upper wall and secured to said keeper element for rotating the latter, and a spring coiled around said shank between the head thereof and the upper wall and urging said keeper element downwardly toward said upper wall, said keeper element having a convex upper surface.

4. A partition panel construction comprising
 (a) a pair of unitary channel members each including
  (1) a pair of parallel, spaced, generally-rectangular vertical side walls,
  (2) a pair of spaced horizontal flanges extending inwardly from the lower edges of said side walls, respectively,
  (3) a pair of longitudinally-spaced horizontal upper walls the longitudinal edges of which are connected with the upper edges of said side walls, respectively, said side walls including, in the space between said upper walls, reduced portions having a smaller vertical dimension than the remaining side wall portions, (4) and a transverse supporting strap beneath the space between said upper walls, said supporting strap including a horizontal first portion adjacent the upper surfaces of said flanges, and a pair of vertical second portions adjacent the inner surfaces of said side wall reduced portions, respectively, said vertical second portions being connected at their lower and upper edges with the longitudinal edges of said strap first portion and with the upper edges of said side wall reduced portions, respectively, said channel members being in superimposed parallel contiguous engagement whereby the horizontal upper walls of the lower channel member engage the flanges of the upper channel member;

(b) a pair of parallel spaced vertical side plates the lower adjacent surfaces of which coextensively engage and are secured to the exterior surfaces of the side walls of said upper channel member, respectively;

(c) and means releasably connecting said lower channel member with said upper channel member, comprising at least one horizontal lock member extending transversely across the upper surfaces of the flanges of said upper channel member, and means connecting said lock member with said lower channel member.

5. A construction as defined in claim 4 wherein said means connecting said lock member with said lower channel member comprises a vertical shaft rigidly connected at its upper end with said lock member, and means rotatably connecting the lower portion of said shaft with an upper wall of said lower channel member.

6. A construction as defined in claim 5 wherein said shaft has a shank portion extending downwardly through a corresponding opening in said lower member upper wall, said shank portion terminating at its lower end in an enlarged head portion, and spring means intermediate said head portion and said lower member upper wall for biasing said lock member and said shaft downwardly relative to said lower member upper wall.

7. A construction as defined in claim 6 wherein said lock member has a vertical dimension that is smaller than the internal vertical dimensional of said side walls.

8. A construction as defined in claim 7 wherein the lower surface of said lock member is planar and horizontal, the upper surface of said lock member having in transverse cross-section a uniformly convex configuration.

9. A construction as defined in claim 7 wherein the length of said lock member is greater than the distance between said side walls, said lock member terminating at each end in parallel vertical end walls, said end walls being angularly arranged relative to the longitudinal axis of said lock member for contiguous abutting engagement with adjacent inner surfaces of the side walls of said upper channel member.

10. A partition construction comprising (a) a plurality of vertical wall panels each including (1) at least one unitary horizontal channel member having (a) a pair of parallel spaced generally-rectangular vertical side walls, (b) a pair of spaced horizontal flanges extending inwardly from the lower edges of said side walls, respectively, (c) a pair of longitudinally-spaced horizontal upper walls the longitudinal edges of which are connected with the upper edges of said side walls, respectively, said side walls including, in the space between said upper walls, reduced portions having a smaller vertical dimension than the remaining side wall portions, (d) and a transverse cable supporting strap beneath the space between said upper walls, said supporting strap including a horizontal first portion adjacent the upper surfaces of said flanges, and a pair of vertical second portions adjacent the inner surfaces of said side walls reduced portions, respectively, said vertical second portions being connected at their lower and upper edges with the longitudinal edges of said strap first portion and with the upper edges of said side wall reduced portions, respectively.

(2) and a pair of parallel spaced vertical side plates the lower adjacent surfaces of which contiguously engage and are secured to the exterior surfaces of said side walls, respectively;

(b) and means mounting said wall panels in end-to-end elevated relationship relative to a fixed horizontal surface, said mounting means affording continuous communication between the ends of said channel members to permit the insertion of electrical conductor means through the communicating channel members of a plurality of said wall panels.

11. A partition construction as defined in claim 10, and further including a second unitary channel member positioned beneath each of said wall panels, and means releasably connecting said second channel members with the respective wall panels, the ends of said second channel members being in communication to permit the insertion of electrical conductor means through the communicating second channel members of a plurality of said wall panels.

References Cited by the Examiner
UNITED STATES PATENTS
1,211,562  1/1917  Edwards _____ 52—241
FOREIGN PATENTS
637,988  1950  Great Britain.

FRANK L. ABBOTT, *Primary Examiner.*

J. E. MURTAGH, *Assistant Examiner.*